United States Patent [19]
Takashi

[11] 4,154,553
[45] May 15, 1979

[54] METHOD OF REDUCING FROST HEAVING OF GROUND

[75] Inventor: Tsutomu Takashi, Uji, Japan

[73] Assignee: Seiken Reiki Kabushiki Kaisha, Osaka, Japan

[21] Appl. No.: 821,160

[22] Filed: Aug. 2, 1977

[30] Foreign Application Priority Data

Dec. 13, 1976 [JP] Japan .................. 51-148781

[51] Int. Cl.² ................................. E02D 3/14
[52] U.S. Cl. ........................... 405/264; 404/75
[58] Field of Search ............ 61/36 A, 50, 35, 36 R, 61/36 C; 166/DIG. 1, 274; 404/75, 76, 27, 71, 72

[56] References Cited

U.S. PATENT DOCUMENTS

| | | | |
|---|---|---|---|
| 2,827,964 | 3/1958 | Sandiford et al. | 166/274 |
| 3,925,993 | 12/1975 | Roth | 61/36 A |

FOREIGN PATENT DOCUMENTS 1119891 11/1955 Fed. Rep. of Germany ............ 404/76

*Primary Examiner*—Mervin Stein
*Assistant Examiner*—Alex Grosz
*Attorney, Agent, or Firm*—Burns, Doane, Swecker & Mathis

[57] ABSTRACT

A method of reducing frost heave by increasing the viscosity of water in the ground. The viscosity of the water may be increased by the injection of carboxymethyl cellulose in an amount sufficient to increase the viscosity of the water by a factor of about 30.

5 Claims, 2 Drawing Figures

METHOD OF REDUCING FROST HEAVING OF GROUND

BACKGROUND OF THE INVENTION

This invention relates to a method of reducing the frost heaving that is caused by freezing of ground.

Artificial freezing of ground is a method of thermal soil solidification by freezing of the ground water, and it is employed to stop spring water and to harden soft ground. However, the freezing process causes two undesirable phenomena; i.e., frost heave and frost boils (subsidence). If freezing and thawing cycle of the soft ground is repeated more than twice, frost heaving and subsidence vary widely with each repeated run even if the frost-penetration rate and the effective stress of the ground are perfectly equal to each other. This indicates that the soft ground has no reproducibility of frost action in repetition of the freezing and thawing cycle. It is also known that excessive subsidence takes place during the thawing period in the first cycle of freezing and thawing.

Such phenomena of frost heave and subsidence are mostly attributable to fine grain size and high water content of soil constituting such soft ground and its small precompression stress. In other words, examining the particle size distribution curve of the soil constituting such soft ground, it is found that such soil rarely contains more than 10% of sand and gravel components with grain size of greater than 70 microns in diameter. Usually, the silt and clay components account for more than 90%. Such fine particle soils have strong water absorptivity on account of capillarity thereof and hence are high in water retainability so that the ground maintains high water content unless it is subjected to a greater stress than its own weight and is given any chance of drying throughout its history from formation of the ground up to date. Therefore, such soft ground is immediately consolidated and reduced in volume.

If a greater load than its precompression stress, which is usually less than 1 kg/cm$^2$, is applied to the ground and if water is absorbed at the freezing front during the freezing, the pore water pressure of soil existing forward of the freezing front drops to increase the effective stress. This causes further consolidation and shrinkage of the soil. This accelerates the phenomenon of frost heave and subsidence upon freezing and thawing of the ground. Therefore, in order to minimize the frost heaving and subsidence in the prosecution of the artificial ground freezing, the initial frost heaving has to be suppressed.

It is accordingly an object of the present invention to reduce frost heave encountered not only in artificial ground freezing but also in the northern latitude where seasonal freezing and thawing of the ground takes place. The method of this invention accomplishes this object by increasing the viscosity of the pore water in the ground through the injection of a liquid chemical.

DETAILED DESCRIPTION OF THE PREFERRED EMBODIMENT

The principle of this invention may be understood by reference to an example as adapted to the ground freezing process.

Figure 1:
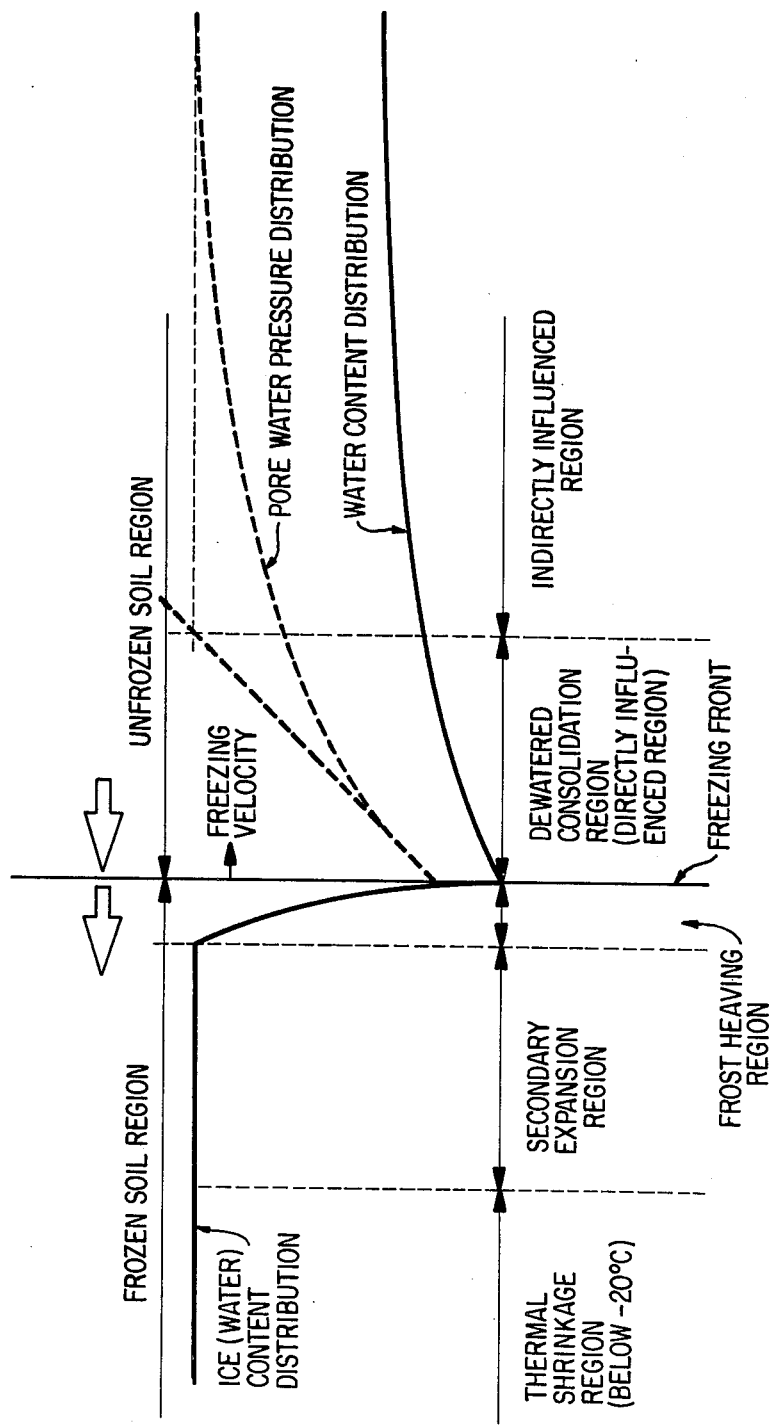
FIG. 1 is a diagramatic drawing of the ground in the ground freezing process; and, FIG. 2 is a diagram showing the relationship between pore water pressure distribution in unfrozen soil and dewatered consolidation region in the ground in the ground freezing process.

The diagram of FIG. 1 represents the vicinity of a freezing front which advances from left to right at a constant penetration rate in homogeneous saturated soil. As illustrated, there is a frost heaving region which covers a certain distance in the rear (frozen-soil side) of the freezing frost on which the free water in pore water freezes and where the soil heaves on absorbing water. The pore water of the unfrozen-soil side continues to a "water-absorption ceasing front" at the left end of this area, where frozen free water and un-frozen water (bound water) coexist, and pore water of the unfrozen soil side is sucked in through communication to said pore water and frozen to cause the heave.

A secondary expansion region is located on the left side of the frost heaving region. As there is no longer any supply of pore water, expansion, if any, occurs only from freezing of unfrozen water around the soil particles, and is small in quantity.

A thermal shrinkage region is located on the left side of the secondary expansion region where the frozen soil slightly shrinks because the shrinkage due to the temperature drop of soil particles and ice is greater in quantity than the expansion due to the freezing of unfrozen water.

A dewatered consolidation region is located on the right side of freezing frost, pore water pressure drops to increase effective stress as a result of the pore water sucked into the frost heaving region. Consequently, dropping of the pore water pressure causes consolidation of soil. Thus, the shrinkage and the increase of the effective stress of the soil in this region take place at the same time, reducing its frost heaving.

An indirectly influenced region is stretched on the right side of the "dewatered consolidation region" and indirectly receives the influence of the frost heave region.

Figure 2:
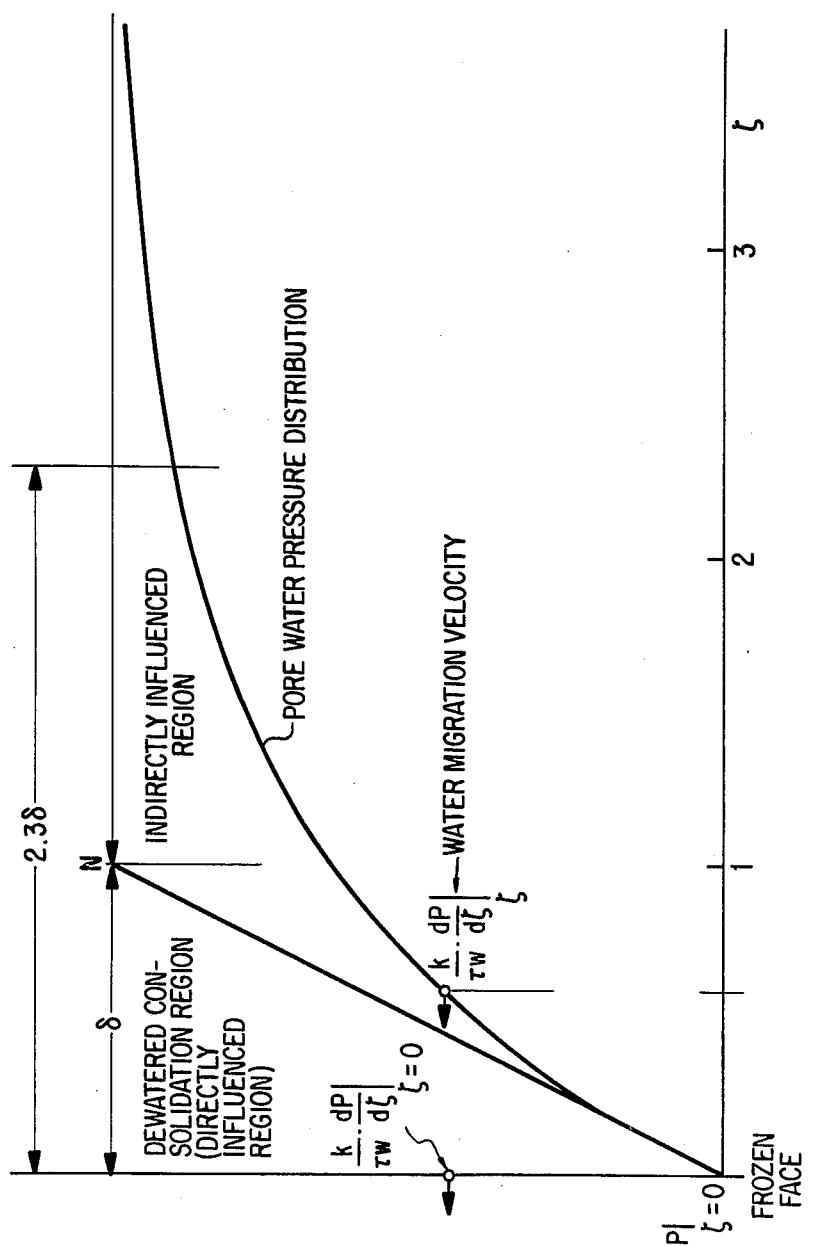

Thus, it may be said that generally frost heaving occurs on the left side of the freezing front while shrinkage takes place on the right side. The extent of the "dewatered consolidation region" is not so wide, for the permeability of the soft ground is so small that it cannot draw water from very far away as shown in the diagram of FIG. 2. It will be noted that the dewatered consolidation region $\delta$ is defined as a distance between the freezing front and the intersecting point N of the tangent of the pore water pressure distribution curve at the freezing front with the tangent of pore water pressure at infinity. Consequently, FIG. 2 expresses the relationship between the pore water distribution and the dewatered consolidation region $\delta$.

As explained above, frost heaving occurs as water is drawn along a certain distance on the frozen solid side of the freezing front where water in the ground is frozen. Frost heaving can be minimized by reducing the amount of water drawn into the frost heaving region from the unfrozen soil region. This can be accomplished by decreasing the migration velocity of pore water. The migration velocity V is calculated by means of Darcy's law;

$$V = \frac{\eta w k_o}{\eta} \cdot \frac{1}{\gamma w} \cdot \frac{dP}{d\xi}\bigg|_\xi$$

where:
 $k_o$=the coefficient of permeability of pore water,
 $\eta w$,—coefficient of viscosity of pore water and viscosity given to pore water,
 $\gamma w$=unit weight of water,
 P=pore water pressure, and
 $\zeta$=distance from the freezing front
Since $$\frac{dP}{d\xi}\bigg|_{\xi=o}$$

is determined from the pore water distribution curve and $k_o$ is constant, the migration velocity V of pore water may be decreased if its coefficient of viscosity is increased.

In an embodiment of this invention where a small amount of carboxymethyl cellulose (CMC) was injected into soft ground to increase viscosity of pore water in the ground prior to the freezing of the ground, it was found that the frost heaving was reduced to approximately 1/6 of that in the conventional practice.

CMC is not the only agent which may be used for increasing viscosity of pore water and thus usuable in the practice of this invention. By way of example, other suitable substances include hydroxyethyl cellulose, methyl cellulose, polyvinyl alcohol, polyvinyl acetate, sodium polyacrylate, polyacrylic amide, starch such as corn starch, natural gum such as gum arabic and seaweed such as sodium alginate. But use of CMC is recommendable as it is harmless, even used in foods, and hence involves no problem of pollution. Also, as injection of CMC or other like chemicals can be accomplished during installation of the freezer pipe, the present invention can be easily practiced.

Furthermore, the method of this invention can be applied to suppress the frost heaving encountered not only artificial ground freezing but also in the cold region where seasonal freezing and thawing of the ground takes place.

In order to further clarify the above-said effect of this invention in suppressing frost heaving of ground, an experimental example of this invention is described below.

Soil sample used in the experiment was extremely frost susceptible Manaitabashi-clay obtained in Kudanshita, Tokyo. Sand and sample coil were put into each of three acrylic cylinders A,B and C, which had an inner diameter of 32 mm and a length of 370 mm. A bottom cover was made of gun metal to the height of 30 mm and 90 mm, respectively. As substitute for water which would move toward the freezing front, CMC solution of which the coefficient of viscosity $\eta=167$ cps (concentration=1%) and $\eta=28.9$ cps (concentration=0.5%) was respectively supplied into the soild samples A and B, and untreated water of coefficient of viscosity 1 cps at 21° C. was similarly supplied into the cylinder C. Control of freezing speed was achieved by lowering the soil samples contained in the cylinders into an antifreeze bath of which temperature was −15° C. Freezing occurred from bottom to top at fixed speed (approximately 0.8 mm/hr). The reason why the moistured sand was placed at the bottom of cylinder in this experiment is intended to eliminate unstability of freezing speed of initiation of freezing.

It is noted that the rate of frost heaving are low in Samples A and B but extremely high in sample C. Note also that the frost heaving was so great that the rise of said unfrozen soil could not be held within the length of the cylinder. So, this 40 mm thick unfrozen soil was transferred into another cylinder of the same size and subjected to the similar freezing treatment. As a result, formation of a pure ice layer that is free with soil particles substantially, or so-called ice lens, was observed, and the final frost heave ratio which defined as $\Delta h/H_o$ (where $\Delta h$=frost heave amount and $H_o$=initial height of soil sample) was as great as 1100%. This forms a striking contrast to 44.2% in sample A and B using CMC in a water solution to elevate the viscosity to about 1/20 of that in sample using ordinary water. This attests the fact that frost heave can be phenomenally suppressed by increasing viscosity of water supplied.

It is also noted from the results of the above experiment that the difference in the frost heave ratio between samples A and B is not significant. Hence it is concluded that a satisfactory check on frost heaving of the ground in the ground freezing process or in ground frozen naturally can be attained by increasing about 30-fold the viscosity of water moving toward the freezing front.

What is claimed is:
 1. A method of reducing frost heaving of ground comprising the steps of:
  (a) providing a liquid having a viscosity greater than that of the water in the unfrozen ground in the area in which frost heaving is to be reduced; and
  (b) injecting the liquid into the unfrozen ground within the area to thereby increase the viscosity of the water within the area.
 2. A method as in claim 1, wherein said liquid is carboxymethyl cellulose.
 3. A method as in claim 2, wherein the volume of liquid injected is sufficient to increase the viscosity of the water in the ground by a factor of about 30.
 4. A method as in claim 1, wherein the volume of liquid injected is sufficient to increase the viscosity of the water in the ground by a factor of about 30.
 5. A method of reducing frost upheaval in ground comprising the steps of:
  (a) providing a liquid which, when injected into the unfrozen ground, decreases the migratory velocity of water in the ground; and,
  (b) injecting the liquid into the unfrozen ground to thereby decrease the migratory velocity of the water in the ground.

* * * * *